(12) United States Patent  
Higashitani (10) Patent No.: US 7,742,202 B2  
(45) Date of Patent: Jun. 22, 2010

(54) IMAGE READING APPARATUS AND IMAGE FORMING APPARATUS

(75) Inventor: Masahiro Higashitani, Osaka (JP)

(73) Assignee: Kyocera Mita Corporation (JP)

( * ) Notice: Subject to any disclaimer, the term of this patent is extended or adjusted under 35 U.S.C. 154(b) by 156 days.

(21) Appl. No.: 12/030,924

(22) Filed: Feb. 14, 2008

(65) Prior Publication Data

US 2008/0198424 A1     Aug. 21, 2008

(30) Foreign Application Priority Data

Feb. 20, 2007   (JP)   ............................. 2007-039854

(51) Int. Cl.
*H04N 1/04* (2006.01)
(52) U.S. Cl. .................. 358/484; 358/475; 358/497; 358/474; 250/227.11; 250/234; 399/221; 399/220; 399/212
(58) Field of Classification Search ............. 358/484, 358/475, 509, 483, 482, 512–514, 474, 497, 358/505; 250/208.1, 239, 216, 227.11, 227.14, 250/234, 235; 399/221, 220, 212, 211; 355/67, 355/68, 69
See application file for complete search history.

(56) References Cited

U.S. PATENT DOCUMENTS 7,436,556 B2 * 10/2008 Onishi et al. ................. 358/484
7,538,911 B2 *  5/2009 Sakurai et al. ............... 358/475
7,548,352 B2 *  6/2009 Sakurai et al. ............... 358/475

FOREIGN PATENT DOCUMENTS

JP          2-284571        11/1990

\* cited by examiner

*Primary Examiner*—Cheukfan Lee  
(74) *Attorney, Agent, or Firm*—Gerald E. Hespos; Michael J. Porco (57) ABSTRACT

A light-collective member (142) for collecting a light outputted from a light source (140), which irradiates a light toward a document surface, toward a sub-scanning direction is provided in front of the light source (140). An illuminating portion which is so formed that each of opposite end surfaces (170, 172) in the main scanning direction of the light-collective member (142) has an obtuse angle with respect to a bottom surface (174) facing the light source (140).

8 Claims, 8 Drawing Sheets

IMAGE READING APPARATUS AND IMAGE FORMING APPARATUS

BACKGROUND OF THE INVENTION

1. Field of the Invention

The present invention relates to an image reading apparatus for forming an image of a light reflected from a document surface as a document image on a light-receiving surface of an imaging device, and an image forming apparatus, e.g. a copying machine, a facsimile machine, and a complex machine having functions of those, which is provided with the image reading apparatus.

2. Description of the Related Art

In recent years, an image forming apparatus such as a copying machine and a printer has been generally used which has an image forming section operable to form a toner image on a surface of a photoconductive drum on which an electrostatic latent image is formed and then transfer the toner image onto a recording sheet. In such image forming apparatus, there is provided an image reading apparatus which uses an imaging lens to form an image of a reflected light, which is obtained by irradiating a light to a document surface from a light source (exposure light source) constituting an illuminating portion, as a document image onto a light-receiving surface of an imaging device (photoelectric conversion element) as a line sensor such as a CCD (Charge Coupled Device).

Figure 9:
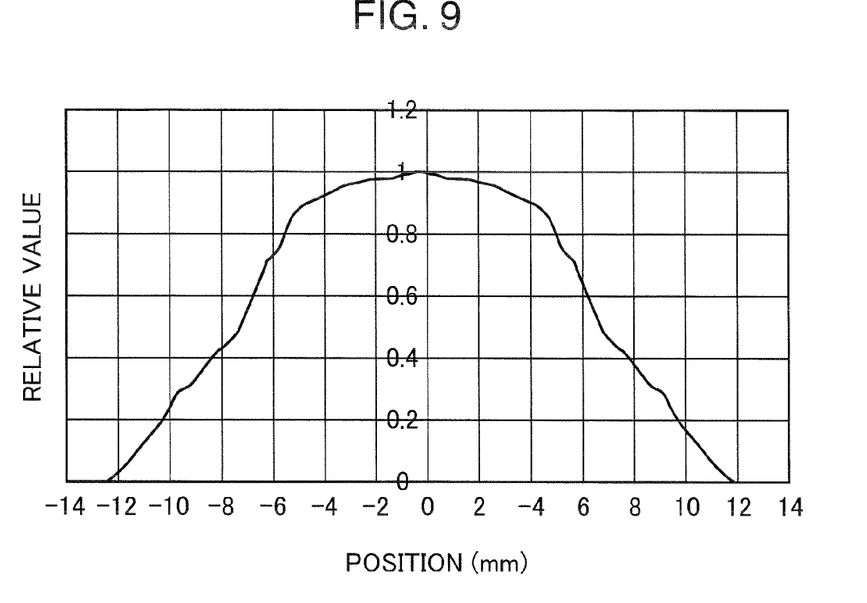
FIG. 9 shows an illuminance distribution in a sub-scanning direction of a xenon lamp.

In the conventional image reading apparatus so configured as described above, a rod-like light source such as a xenon lamp is generally used as a light source for irradiating a light to a document surface. According to such illuminating portion using a xenon lamp, which is a rod-like light source, an illuminance distribution in sub-scanning direction which is a relative moving direction with respect to the light source and the document surface at a time of reading a document, (a light distribution over a cross section in sub-scanning direction) has a flat peak characteristic as shown in FIG. 9, so that an illumination efficiency is bad. Accordingly, there has been a problem that it would be necessary to improve an ability to converge a light in sub-scanning direction, and it would be also necessary to prevent image deterioration caused by lowering in light intensity at end portions in the main scanning direction, which is a direction perpendicular to the sub-scanning direction, of the imaging device due to an effect of deformation caused by the imaging lens.

Figure 10:
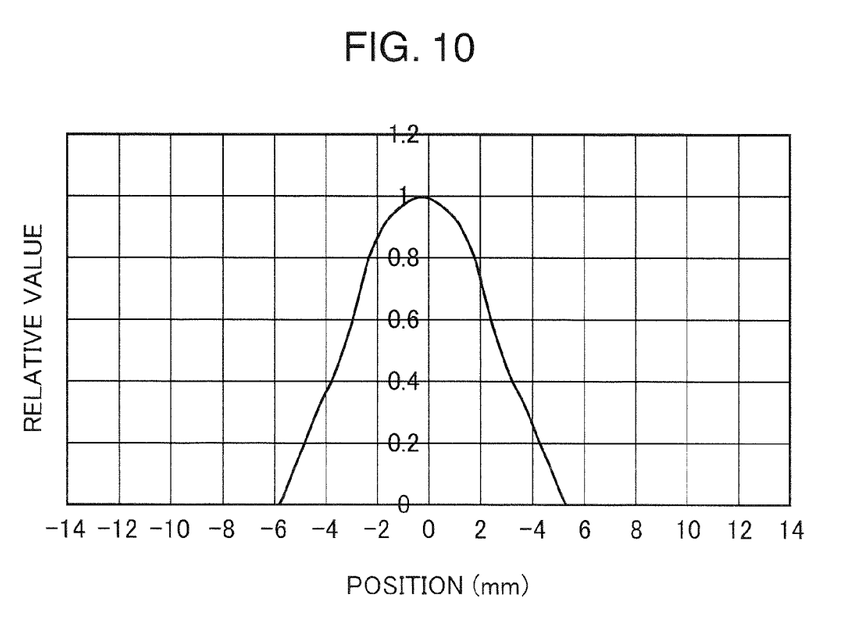
FIG. 10 shows an illuminance distribution in the sub-scanning direction of the light-emitting diode.

Therefore, it has been proposed to align a plurality light-emitting diodes in the main scanning direction, and on the other hand arrange the light-emitting diodes so as to be not densely at a central portion in the line direction but densely at end portions, and to provide a collective lens between the light source and the document surface (for example, Japanese Patent Unexamined Publication No. H2-284571, referred to as a patent document 1 hereinafter). In the illuminating portion so configured as described above, since the illuminance distribution in the sub-scanning direction of the light-emitting diodes has a sharp-pointed peak characteristic as shown in FIG. 10, and the collective lens is provided between the light source and the document surface, excellent illumination efficiency can be achieved. Further, since the light-emitting diodes are arranged densely in peripheral portions, the light intensity at end portions of the light source increases. Consequently, it causes lowering of the light intensity at end portions in the main scanning direction of the imaging device to be less likely to occur, so that the image deterioration can be prevented.

However, even though good illumination efficiency can be achieved, and image deterioration at end portions in the main scanning direction of the imaging device can be prevented according to the proposed image forming apparatus, it causes problems that increasing the number of light-emitting diodes at the end portions causes costs to rise, and manufacturing of the light source becomes complicated since it would be necessary to arrange the pitch of the light-emitting diodes at the central portion be different from that at the end portions.

SUMMARY OF THE INVENTION

The present invention was made in view of the above-described circumstances, and its object is to provide an image reading apparatus and an image forming apparatus which achieves an excellent illumination efficiency and is capable of easily preventing occurrence of image deterioration from occurring at peripheral portions in the main scanning direction of the imaging device.

To achieve the above-described object, the present invention includes an image reading apparatus which forms an image of a reflected light reflected from a document surface as a document a document image on a light-receiving surface of an imaging device, the image reading apparatus comprising: a running member which is so configured as to run along the document surface; a light source mounted to the running member for irradiating a light to the document surface, the light source extending in a main scanning direction which is perpendicular to a running direction of the running member; an illuminating portion including a light-collective member which is mounted in front of the light source for collecting a light outputted from the light source toward the sub-scanning direction which is the running direction of the running member. Each of opposite end surfaces in the main scanning direction of the light-collective member is so formed as to have an obtuse angle with respect to a bottom surface facing the light source.

According to the above-described configuration, since the light outputted from the light source is collected by the light-collective member in the sub-scanning direction, excellent illumination efficiency is achieved. Further, since each of the opposite end surfaces in the main scanning direction of the light-collective member is so formed as to have an obtuse angle with respect to the bottom surface facing the light source, a reflection angle of a light incident from the light source becomes larger at the opposite end surfaces of the light-collective member, so that light intensity at end portions in the main scanning direction of the light-collective member increases. Consequently, the image reading apparatus can easily prevent image deterioration which occurs at end portions in the main scanning direction of the imaging device.

These and other objects, features and advantages of the present invention will become apparent upon reading of the following detailed description along with the accompanied drawings.

BRIEF DESCRIPTION OF DRAWINGS

FIG. 7 shows a light intensity in the main scanning direction of light incident to the light-receiving surface of the imaging device.

DETAILED DESCRIPTION OF THE PREFERRED EMBODIMENTS

Figure 1:
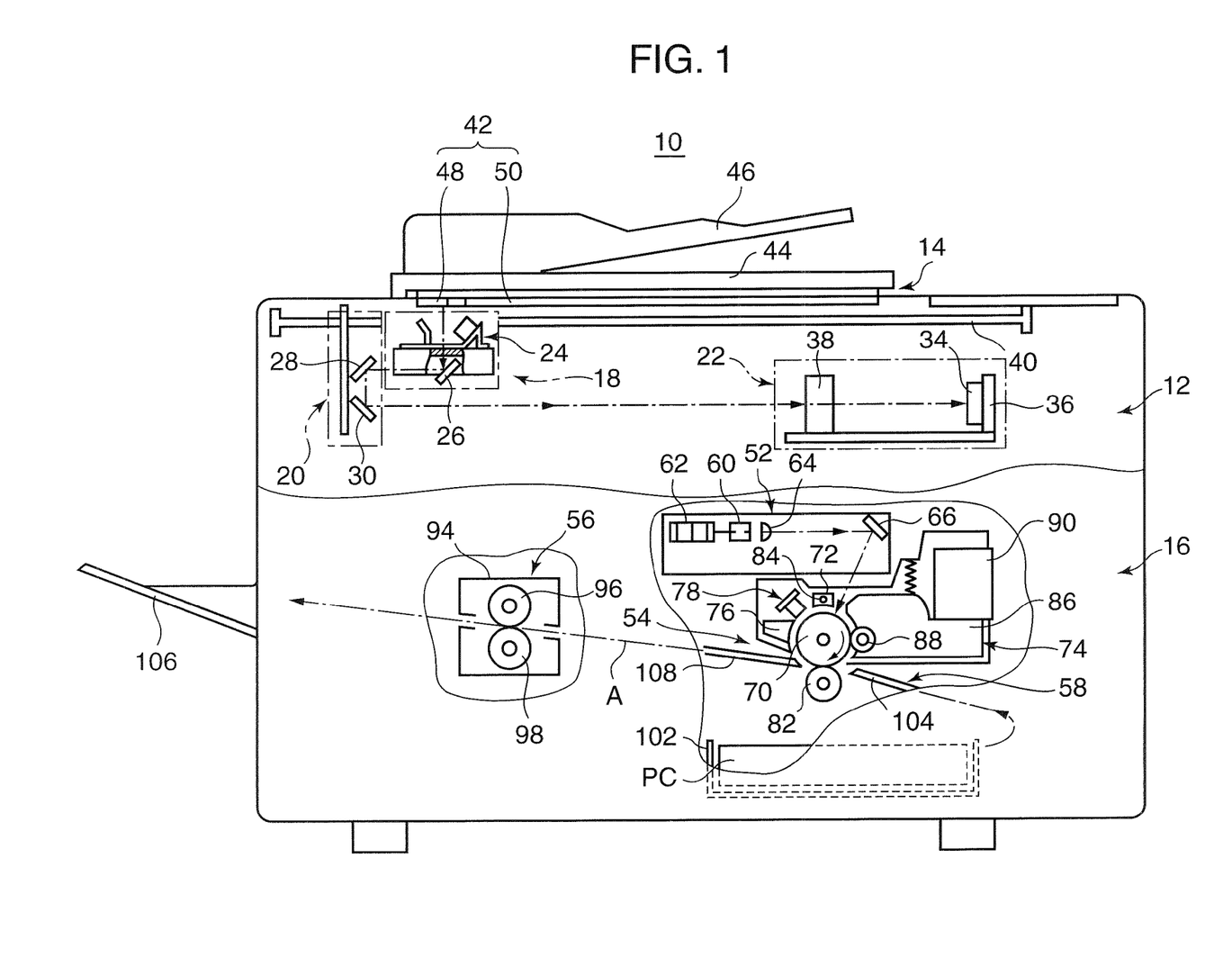
FIG. 1 schematically shows an internal configuration of an image forming apparatus which adopts an image reading apparatus according to an embodiment of the present invention.

FIG. 1 schematically shows an internal configuration of an image forming apparatus which adopts an image reading apparatus according to the embodiment of the present invention. Referring to FIG. 1, an image forming apparatus 10 constitutes a copying machine which is operable to form an image on a recording sheet in accordance with a document image which is captured by an imaging device which converts a light into an electric signal. The image forming apparatus 10 includes an image reading section 12 for reading a document image, a document holding section 14 positioned over the image reading section 12, and an image forming section 16 positioned below the image reading section 12.

The image reading section 12 constitutes an image reading apparatus, and includes a first optical system 18, a second optical system 20, and an image capturing portion 22. The first optical system 18 is adapted to read a document image by irradiating a light to a document surface, and integrally includes an illuminating portion 24 and a reflective mirror 26. The illuminating portion 24 has a light source (exposure light source) having a plurality of light-emitting diodes which are aligned. The reflective mirror 26 orients a light irradiated from the illuminating portion 24 and reflected from a document surface, toward a horizontal direction so as to lead the light to the second optical system 20. A specific configuration example of the illuminating portion 24 will be described hereinafter.

The second optical system 20 is provided on left side of the first optical system 18 in the drawing and adapted to lead the light reflected from the document surface of the first optical system 18 to the image capturing portion 22. The second optical system 20 has a first reflective mirror 28 and a second reflective mirror 30 which are adapted to lead the light reflected from the document surface and reflected by the reflective mirror 26 of the first optical system 18 to the image capturing portion 22. The first reflective mirror 28 and the second reflective mirror 30 are so configured that the first reflective mirror 28 receives the light reflected from the document surface and reflected by the reflective mirror 26 of the first optical system 18 and leads the reflected light to the second reflective mirror 30, and the reflected light obtained from the document surface and reflected by the second reflective mirror 30 is oriented toward the horizontal direction so as to lead the reflected light to the image capturing portion 22.

The image capturing portion 22 is provided on right side of the second optical system 20 in FIG. 1, and has a circuit board 36 and an imaging lens 38. The circuit board 36 is provided with an imaging device 34 as a line sensor including a CCD (Charge Coupled Device) for reading a document image of the reflected light by converting the light to an electric signal. The imaging lens 38 is provided closer to the second optical system 20 than the circuit board 36 and adapted to form a document image of the reflected light led by the second optical system 20 on a light-receiving surface of the imaging device 34. The document image read by the imaging device 34 is applied with a predetermined signal processing and thereafter converted to a digital signal, and then stored in an unillustrated storage device.

In an upper portion of the image reading section 12, there are provided a pair of guide rails 40 (only one of the rails is illustrated in FIG. 1) at opposite ends in a width direction (a direction perpendicular to the sheet of FIG. 1) for guiding running of the first optical system 18 and the second optical system 20 in a direction between the left end position and the right end position of the document holding section 14 in FIG. 1. The first optical system 18 and the second optical system 20 are engaged with the guide rails 40 and reciprocated along the guide rails 40 by an unillustrated drive motor. Here, a direction in which the first optical system 18 and the second optical system 20 runs along the guide rails 40 is referred to as a sub-scanning direction, and a direction perpendicular to the running direction of the first optical system 18 and the second optical system 20 is referred to as a main scanning direction.

The document holding section 14 has a contact glass 42 mounted on the image reading section 12, a document pressing member 44 which is operable to open and close on an upper surface of the contact glass 42, and an automatic document feeding section 46 provided on the document pressing member 44. Here, the contact glass 42 is constituted by a first contact glass 48 above which a document conveyed by the automatic document feeding section 46 passes through, and a second contact glass 50 on which a still document is placed. An upper surface of the document pressing member 44 constitutes a sheet discharging section to which a stack of documents placed on the automatic document feeding section 46 is discharged.

The automatic document feeding section 46 automatically feeds a stack of documents placed on a predetermined position one after another to the first contact glass 48. On the other hand, the automatic document feeding section 46 sends the read documents successively to the sheet discharging section provided on the upper surface of the document pressing member 44.

The image forming section 16 includes a laser scanner unit 52, an imaging section 54, a fixing section 56, and a sheet-conveying section 58. The laser scanner unit 52 is adapted to allow the document image, which is read by the imaging device 34, read from the unillustrated storage device to a photoconductive drum 70 which will be described hereinafter, and has a laser emitting section 60, a polygon mirror 62, an fθ lens 64, and a reflective mirror 66. The laser emitting section 60 is adapted convert a modulation signal created in accordance with the read image data into a laser beam and output the same. The polygon mirror 62 is a rotating polyhedral member adapted to reflect the laser beam outputted from the laser emitting section 60 toward the photoconductive drum 70 which will be described hereinafter. The fθ lens 64 is adapted to convert a light defectively scanned in the main scanning direction by the polygon mirror 62 into a uniform motion. The reflective mirror 66 is adapted to lead the laser beam reflected by the polygon mirror 62 and transmitted through the fθ lens 64 to an exposure position of the photoconductive drum 70.

Here, the polygon mirror 62 is rotationally driven by an unillustrated polygon motor in a certain direction at a certain speed and so configured that sequential changes in angles of a mirror surface which reflects the laser beam outputted from the laser emitting section 60 allows the laser beam to scan the photoconductive drum 70 in a width direction. In other words, the polygon mirror 62 polarizes the laser beam outputted from the laser emitting section 60 and irradiates the laser beam to the photoconductive drum 70, so that an electrostatic latent image is written on the photoconductive drum 70.

The imaging section 54 has the photoconductive drum 70 rotationally driven at a constant speed, and a charging device 72, a developing section 74, a cleaning section 76, a light irradiating section 78 successively along a peripheral surface of the photoconductive drum 70. The photoconductive drum 70 is rotationally driven by an unillustrated drive motor in an illustrated clockwise direction (arrow direction), on which an electrostatic area is formed at a position facing the charging device 72. A laser beam, which is outputted from the laser scanner unit 52 to the electrostatic area in accordance with a document image, is irradiated so that an electrostatic latent image is formed. Accordingly, the electrostatic latent image is developed to be a toner image at a position facing the developing section 74. Under the photoconductive drum 70, there is provided a transferring roller 82. The photoconductive drum 70 on which the toner image is formed transfers the toner image to a recording sheet at a position facing the transferring roller 82. After the toner image is transferred to the recording sheet, toners remaining on a surface of the photoconductive drum 70 at the position facing the cleaning section 76 are removed, and an electric charge remaining on the surface of the photoconductive drum 70 is removed by the light irradiating section 78.

The charging device 72 is provided with a charge wire 84 having a length which is the same as, for example, a widthwise length of the photoconductive drum 70. A high voltage is applied to the charge wire 84 by an unillustrated high voltage power source so as to provide an electric charge to the photoconductive drum 70, thereby forming an electrostatic area on the surface of the photoconductive drum 70. The developing section 74 uses two-component developer having, for example, toners and carriers. The developing section 74 has a developing section main body 86 into which developers are supplied, a developing roller 88 provided in the developing section main body 86 in a state of coming close to the photoconductive drum 70, a toner cartridge 90 mounted at an upper part of the developing section main body 86.

The developing section main body 86 includes an unillustrated stirring roller to stir the developer, so that the carriers and toners cause friction to charge the toners. The developing roller 88 is supplied with a drive voltage from an unillustrated drive power source, so that its surface is electrically charged. The developing roller 88 allows toners, which are electrostatically attached to the surface of the developing roller 88, to be attached to the surface of the photoconductive drum 70. The toner cartridge 90 is filled with toners which are to be supplied to the developing section main body 86.

The light irradiating section 78 constitutes a charge-removing portion and orients respective light emitting surfaces of semiconductor light emitting elements such as light-emitting diodes toward the surface of the photoconductive drum 70. The light irradiating section 78 is arranged in an axial direction of the photoconductive drum 70.

The fixing section 56 is adapted to perform a fixing processing by heating a recording sheet onto which a toner image is transferred in the imaging section 54. The fixing section 56 is provided in an upper portion of a heat-shielding box 94 and includes a fixing roller 96 which is heated by a heater provided therein, and a pressing roller 98 which comes in pressed contact with the fixing roller 96 which is provided in a lower portion of the heat-shielding box 94.

The sheet-conveying section 58 is adapted to convey the recording sheet along a path indicated by an arrow A, and includes a cassette mounting section 102 for mounting a sheet feeding cassette PC in which recording sheets of a prescribed size are stored in a stacked state, an upstream side conveying passage 104 for leading to the photoconductive drum 70 recording sheets which are taken from the sheet feeding cassette PC mounted to the cassette mounting section 102 by an unillustrated sheet feeding roller, and a downstream side conveying passage 108 for leading the recording sheets, onto which the toner image is transferred by the photoconductive drum 70, to a sheet discharging tray 106 mounted on the left side in FIG. 1 through the fixing roller 96 and pressing roller 98 of the fixing section 56.

Figure 2:
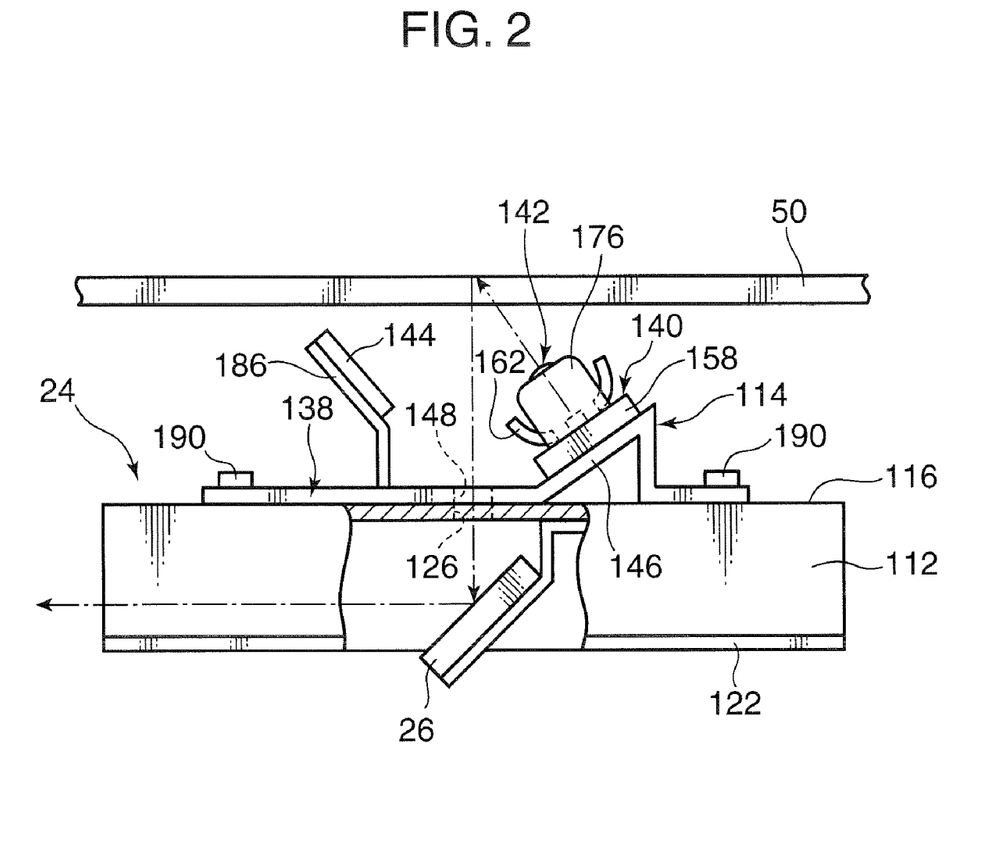
FIG. 2 is a partial side view illustrating a specific configuration example of the image reading apparatus adopted in the image forming apparatus shown in FIG. 1.

FIG. 2 is a side view illustrating a specific configuration example of the above-described illuminating portion 24. Referring to FIG. 2, the illuminating portion 24 includes a frame-like running member 112 which runs along the document surface in conjunction with a reciprocating movement of the first optical system 18 along the guide rails 40, and a light source portion 114 which is mounted to the running member 112.

Figure 3:
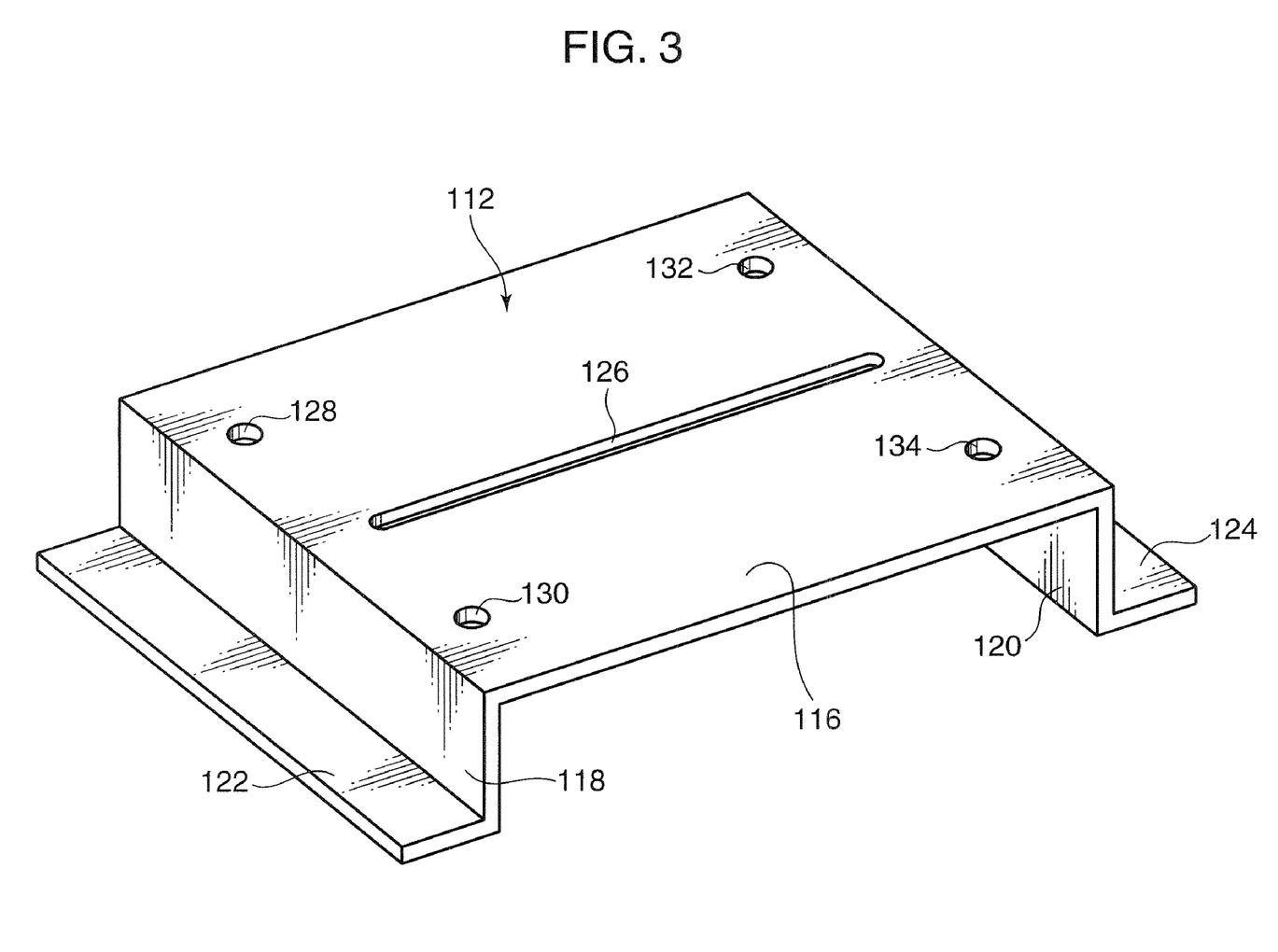
FIG. 3 is a perspective view showing a running frame member constituting an illuminating portion of the image reading apparatus shown in FIG. 2.

The running member 112 is made of a hard material such as a metal material and a resin material. As shown in FIG. 3, the running member 112 extends in the main scanning direction, and includes a flat plate portion 116 having a width dimension (dimension in the main scanning direction) which is longer than a width dimension (direction perpendicular to the sheet of FIG. 1) of the document placed on the contact glass 42, side wall portions 118, 120 bent downward at opposite ends in the main scanning direction of the flat plate portion 116, and collar portions 122, 124 which are bent at lower ends of the side wall portion 118, 120 so as to extend outwardly.

On the flat plate portion 116 of the running member 112, there is formed a slit 126 extending in the main scanning direction at a substantially central portion in the sub-scanning direction for leading the light reflected from the document surface downward. Further, there are formed a pair of threaded holes 128, 130, which are aligned in the sub-scanning direction for fixing the light source portion 114 with screws, on the side of the side wall portion 118, and a pair of threaded holes 132, 134, which are aligned in the sub-scanning direction for fixing the light source portion 114 with screws, on the side of the side wall portion 120. Under the flat plate portion 116 of the running member 112, the above-described reflective mirror 26 for leading the light reflected from the document surface and led through the slit 126 to the second optical system 20 is attached with use of the side wall portions 118, 120.

The light source portion 114 includes a retaining member 138 mounted to the flat plate portion 116 of the running member 112, a light source (exposure light source) 140 mounted to the retaining member 138, a light-collective member 142 for collecting (converging) light outputted from the light source 140 in the sub-scanning direction, and a reflective member 144 for reflecting scattered light emitted from the light source 140 and leading the light to the document surface.

Figure 4:
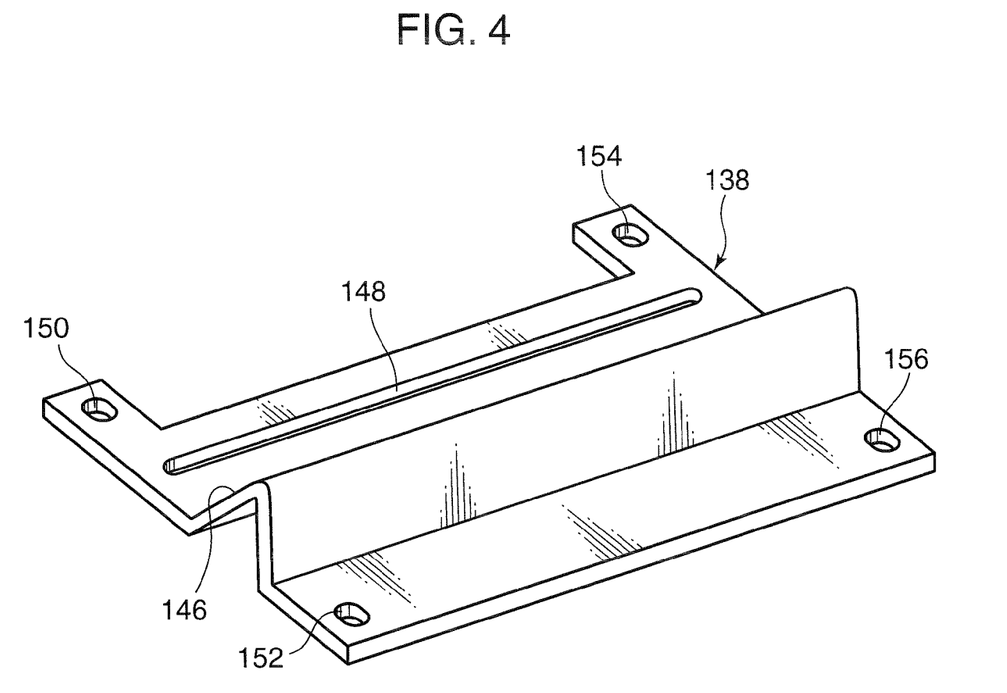
FIG. 4 is a perspective view showing a retaining member constituting the illuminating portion of the image reading apparatus shown in FIG. 2.

The retaining member 138 is made of a hard material such as a metal material and a resin material. As shown in FIG. 4, the retaining member 138 extends in the main scanning direction, and has a width dimension (dimension in the main scanning direction) which is longer than a width dimension (a depth direction in FIG. 1) of a document placed on the contact glass 42, and is so formed that a sloped surface 146 on which the light source 140 is to be attached stands at an acute angle from the plane of the flat plate portion 116 of the running member 112.

On the retaining member 138, there is formed a slit 148 extending in the main scanning direction at a position closer to the second optical system 20 than a position of the sloped surface 146 for leading the light reflected from the document surface downward. Further, there are formed a pair of through holes 150, 152, which are aligned in the sub-scanning direction for fixing the retaining member 138 to the running member 112 with screws, on one end portion side in the main scanning direction, and a pair of through holes 154, 156, which are aligned in the sub-scanning direction for fixing the retaining member 138 to the running member 112 with screws, on the other end portion side in the main scanning direction.

The slit 148 is formed at a position corresponding to the slit 126 formed on the flat plate portion 116 of the running member 112, and the through holes 150, 152 on the one end portion side and the through holes 154, 156 on the other end portion side are formed at positions corresponding respectively to the threaded holes 128, 130 formed on the side of the wall portion 118 and the threaded holes 132, 134 formed on the side wall portion 120, which are formed on the flat plate portion 116 of the running member 112.

Figure 5:
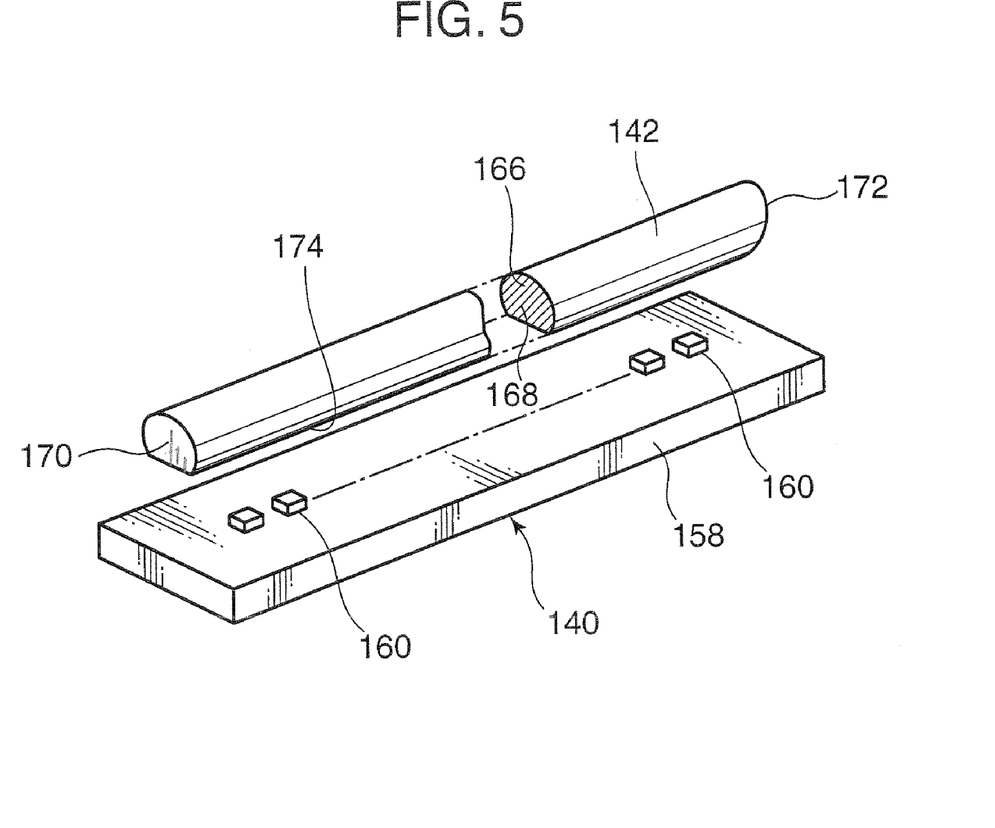
FIGS. 5 and 5a are perspective views showing relevant parts of the light source of the image forming apparatus shown in FIG. 2.

The light source 140 is so formed as to extend in the main scanning direction, which is a direction perpendicular to the running direction of the running member 112, and has a length in the main scanning direction which is close to a width dimension (the depth direction in FIG. 1) of the document placed on the contact glass 42. As shown in FIG. 5 illustrating relevant parts of the light source portion 114, the light source 140 includes a plurality of light-emitting diodes 160 which are aligned in a prescribed pitch on an elongated mounting substrate 158 arranged in the main scanning direction. The mounting substrate 158 on which the light-emitting diodes 160 are mounted is attached to the sloped surface 146 of the retaining member 138. At opposite ends of the light source 140, there are provided reflective hoods 162 (FIG. 2) for collecting scattered light from the light-emitting diode 160 to a center.

The light-collective member 142 is so arranged in front of the light source 140 as to face each of the light-emitting diodes 160, and has a length in the main scanning direction close to the width dimension (depth direction in FIG. 1) of the document placed on the contact glass 42. As shown in FIG. 5 illustrating relevant parts of the light source portion 114, the light-collective member 142 is integrally formed of an optical material having a collective lens portion 166 positioned at its outer side, and a light-leading portion 168 positioned at its inner side for leading the light outputted from each of the light-emitting diodes 160 to the collective lens portion 166.

Figure 6:
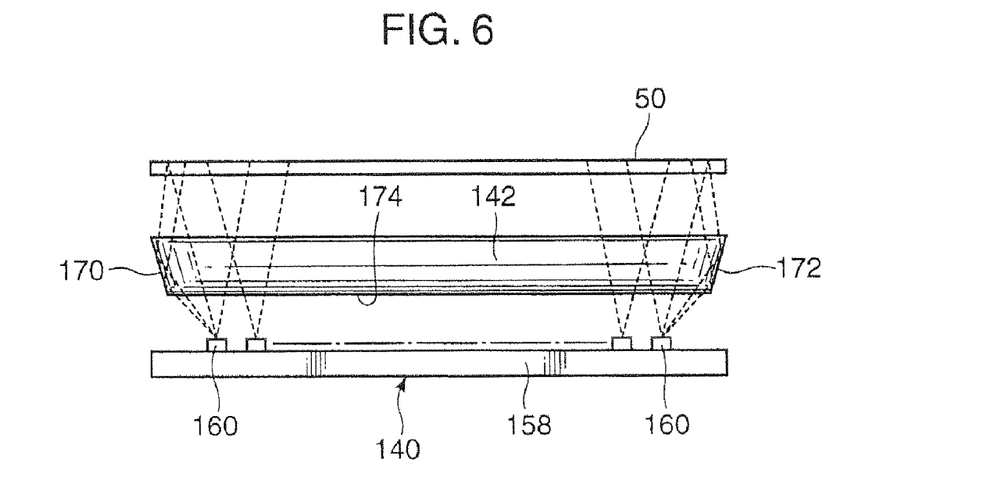
FIGS. 6 and 6a are side views illustrating a light reflected at end surfaces of the light-collective member of the light source shown in FIGS. 5 and 5a respectively.
Figure 6A:
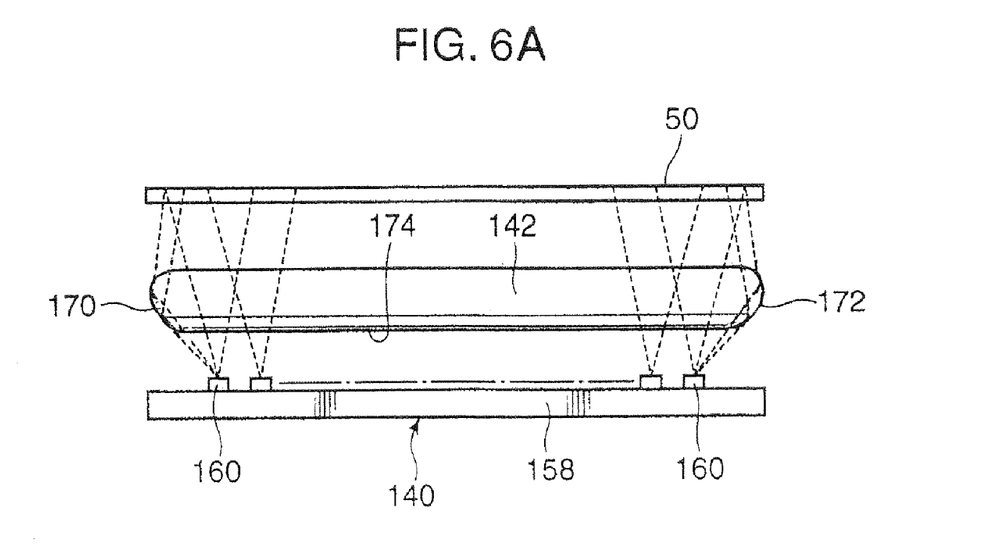

The light-collective member 142, as shown in FIGS. 5 and 6 illustrating relevant parts of the light source portion 114, is so formed that an angle of each of opposite end surfaces 170, 172 in the main scanning direction with respect to a bottom surface 174 facing the light source 140 is obtuse and larger than 90 degrees. The light-collective member 142 is so supported that its opposite end portions in the main scanning direction are partially engaged with supporting plates 176, 176 (only one side is shown in FIG. 2) which are standing on the mounting substrate 158 at opposite ends in the main scanning direction thereof.

In the light source portion 114 so configured as described above, the light source 140 is constituted by the light-emitting diodes 160, and the light outputted from the light source 140 is collected by the light-collective member 142 toward the sub-scanning direction, so that excellent illumination efficiency can be achieved. Further, as shown in FIG. 6, the outputted light incident to the light-collective member 142, which is located in a periphery in the main scanning direction of the light source 140, from the light-emitting diode 160 is partially reflected at the end surfaces 170, 172 and outputted from the light-collective member 142. Since the angle of each of the end surfaces 170, 172 with respect to the bottom surface 174 is obtuse, a reflection angle of light at the end surfaces 170, 172 of the light-collective member 142 becomes large relative to the case where the angle of the end surface 170, 172 with respect to the bottom surface 174 is not obtuse, so that the light is outputted from positions close to the end surfaces 170, 172. Accordingly, the light intensity at end portions in the main scanning direction of the light-collective member 142 increases.

Figure 7A:
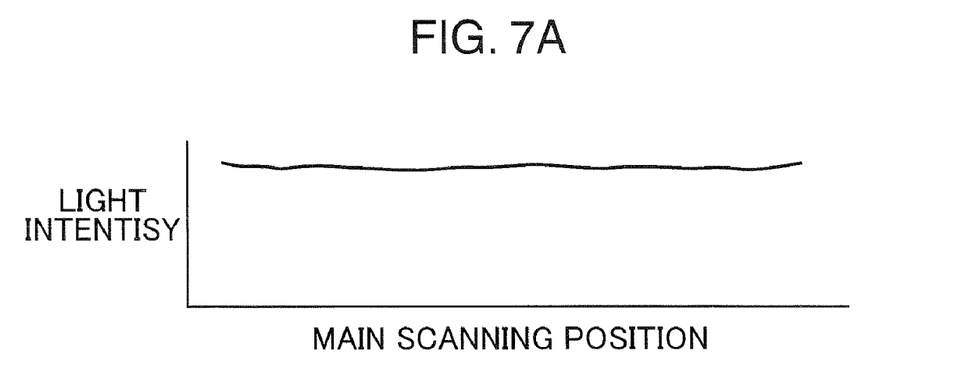
FIG. 7A shows a configuration example of the present invention.
Figure 7B:
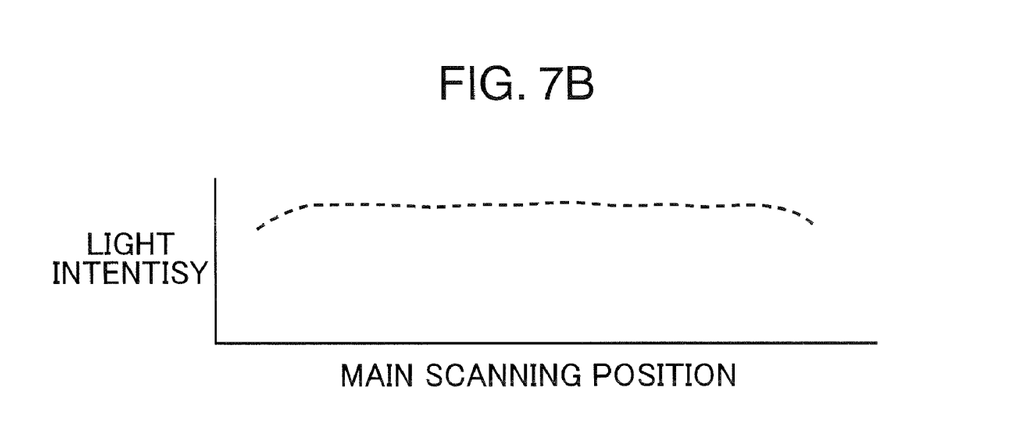
FIG. 7B shows a conventional example.

Therefore, as shown in FIG. 7A, decrease in the light intensity caused by the imaging lens 38 at portions in the main scanning direction of the imaging device 34 becomes less likely to occur, so that the image deterioration can be suppressed effectively. FIG. 7B illustrates for comparison the state where the decrease in the light intensity occurs at end portions in the main scanning direction of the imaging device 34 in the conventional example.

The reflective member 144 is so formed that its length in the main scanning direction is substantially the same dimension as that of the light source 140. The reflective member 144 is provided at a position closer to the second optical system 20 than the slit 148, and is fixed to a supporting member 186 formed by partially raising up the retaining member 138 and slanting the same toward the second optical system 20.

In the illuminating portion 24 so configured as described above, through holes 150, 152 formed on one end portion side of the retaining member 138 and through holes 154, 156 formed on the other end portion side of the retaining member 138 are aligned respectively with the threaded holes 128, 130 formed on the side of one side wall portion 118 of the running member 112 and threaded holes 132, 134 formed on the side of the other side wall portion 120. Then, screw members 190 each having a head portion is engaged with the threaded holes 128, 130 and the threaded holes 132, 134 through the through holes 150, 152 and the through holes 154, 156 and fastened up, so that the light source portion 114 is mounted to the running member 112.

Accordingly, the light reflected from the document surface, which is the light outputted from the light source 140 and having increased light intensity at end portions in the main scanning direction passes through the slit 148 of the retaining member 138 and the slit 126 of the running member 112 to be led to the reflective mirror 26 mounted to the running member 112. Then, the light is reflected at first and second reflective mirrors 28, 30 of the second optical system, and led to the imaging device 34 through the imaging lens 38.

The image forming apparatus 10 so configured as described above is operated as follows. In other words, a stack of documents is placed on the automatic document feeding section 46, and on the other hand the number of images to be formed is set with use of an unillustrated operation panel. Further, on the other hand, image forming density and image forming magnification are set, and thereafter an unillustrated start button is turned on, so that the documents are sequentially conveyed to the first contact glass 48 and passes through above the first contact glass 48. At this time, the reflected light reflected from the document surface, which is obtained in such a manner that the light is irradiated to the document surface from the light source 140 constituting the illuminating portion 24 stopped at a position corresponding to the first contact glass 48 is led to the imaging device 34 through the reflective mirror 26 of the first optical system 18 and the first reflective mirror 28 and the second reflective mirror 30 of the second optical system 20, so that a document image is read and stored into an unillustrated storage device. The document passes through above the first contact glass 48 is discharged onto a sheet discharging section formed on an upper surface of the document pressing member 44.

In the case where the document is a binded object such as a book, the document pressing member 44 is opened to place the document onto the second contact glass 50. On the other hand, the number of images to be formed is set through an unillustrated operation panel, and image forming density and image forming magnification are set, and thereafter the unillustrated start button is turned on. Accordingly, the illuminating portion 24 moves to scan the document surface, and the light reflected from the document surface, which is obtained in such a manner that the light is irradiated to the document surface from the light source 140 constituting the illuminating portion 24 is led to the imaging device 34 through the reflective mirror 26 of the first optical system 18 and the first reflective mirror 28 and the second reflective mirror 30 of the second optical system 20, so that a document image is read and stored into an unillustrated storage device.

On the other hand, the surface of the photoconductive drum 70 is charged by the charging device 72, and a laser beam is irradiated in accordance with a document image stored in the unillustrated storage device. Then, the laser beam is polarized and irradiated by the polygon mirror 62, so that the surface of the photoconductive drum 70 is exposed to form an electrostatic latent image thereon. Next, toners supplied from the developing section 74 to the photoconductive drum 70 are attached to the electrostatic latent image, so that a toner image is formed on the surface of the photoconductive drum 70.

Then, recording sheets stored in the sheet feeding cassette PC are supplied to the side of the pair of registration rollers by the unillustrated sheet feeding roller through the upstream side conveying passage 104 and conveyed to a position between the photoconductive drum 70 and the transferring roller 82 by the pair of registration rollers in synchronism with forming of the electrostatic latent image. Onto the recording sheet conveyed to the position between the photoconductive drum 70 and the transferring roller 82, the toner image formed on the photoconductive drum 70 is transferred by the transferring roller to which the voltage having a polarity opposite with respect to the polarity of the electrostatic latent image. Then, the toner image is separated from the photoconductive drum 70 and conveyed to the fixing section 56 through the downstream side conveying passage 108. Then, the fix processing performed to the recording sheet, and thereafter the recording sheet is discharged to the sheet discharging tray 106.

After the toner image is transferred, toners remained on the surface of the photoconductive drum 70 are removed by the cleaning section 76. On the other hand, an electric charge remained on the surface of the photoconductive drum 70 is removed by the light irradiating section 78. Then, the operations are performed sequentially and repeated, so that image forming is executed with respect to a predetermined number of recording sheets.

In the image forming apparatus 10 adopting the image reading apparatus according to the present invention, as described in the embodiment, the light source 140 is constituted by the light-emitting diodes 160, and the light outputted from the light source 140 is collected toward the sub-scanning direction by the light-collective member 142, so that excellent illumination efficiency can be achieved. Further, since each of opposite end surfaces in the main scanning direction of the light-collective member 142 is so formed as to have an obtuse angle with respect to the bottom surface facing the light source 140, the light intensity at end portions in the main scanning direction of the light-collective member 142 increases. Consequently, image deterioration occurring at the peripheral portions in the main scanning direction of the imaging device 34 and caused by the imaging lens 38 can be easily suppressed.

The image forming apparatus 10 adopting the image reading apparatus according to the present invention is not limited to have the configuration described above. For example, various modified configurations which will be described hereinafter can be adopted when needed.

(1) In the above-described embodiment, the light source 140 is so configured that a plurality of light-emitting diodes 160 are aligned in the main scanning direction. However, the present invention is not limited to this. For example, as long as the light-collective member 142 can collect (converge) the light outputted from the light source 140 toward the sub-scanning direction, the light source may be so configured that other spot-like light emitting device which emits light in accordance with a luminescence principle different from that of the light-emitting diode 160, or may be a rod-like light source which emits light evenly throughout its main scanning direction.

Figure 8:
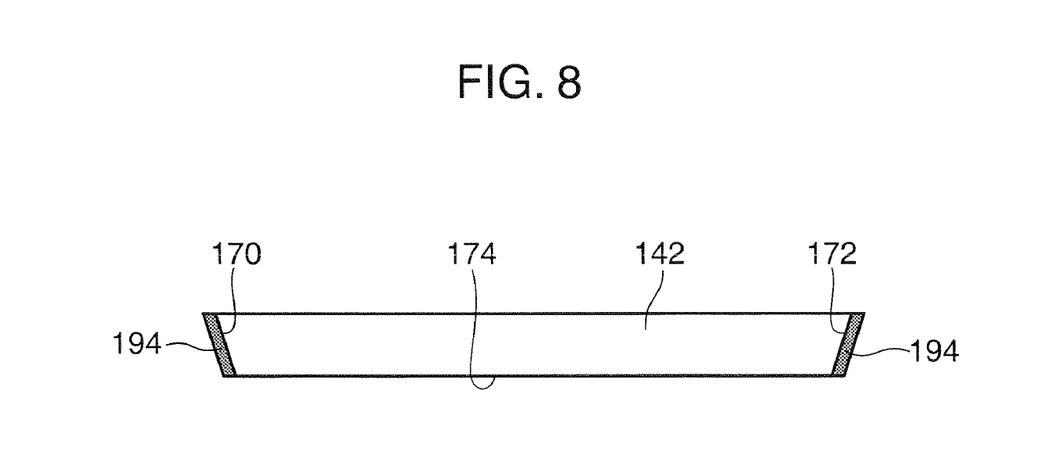
FIG. 8 is a side view illustrating another configuration example of end surfaces of the light-collective member of the light source portion shown in FIG. 5.

(2) In the above-described embodiment, the light-collective member 142 is so configured that each of the opposite end surfaces 170, 172 arranged in the main scanning direction is so formed as to have an obtuse angle with respect to the bottom surface 174. However, the present invention is not limited to this. For example, as shown in FIG. 8, reflective films 194, which are adapted to reflect an incident light from the light source 140 inwardly, may be formed on the opposite end surfaces 170, 172 in the main scanning direction by depositing metal material such as aluminum from outer side. This increases the reflective light intensity at the opposite end surfaces 170, 172, so that the light intensity of the light outputted from the light-collective member 142 increases at the end portions in the main scanning direction.

Figure 5A:
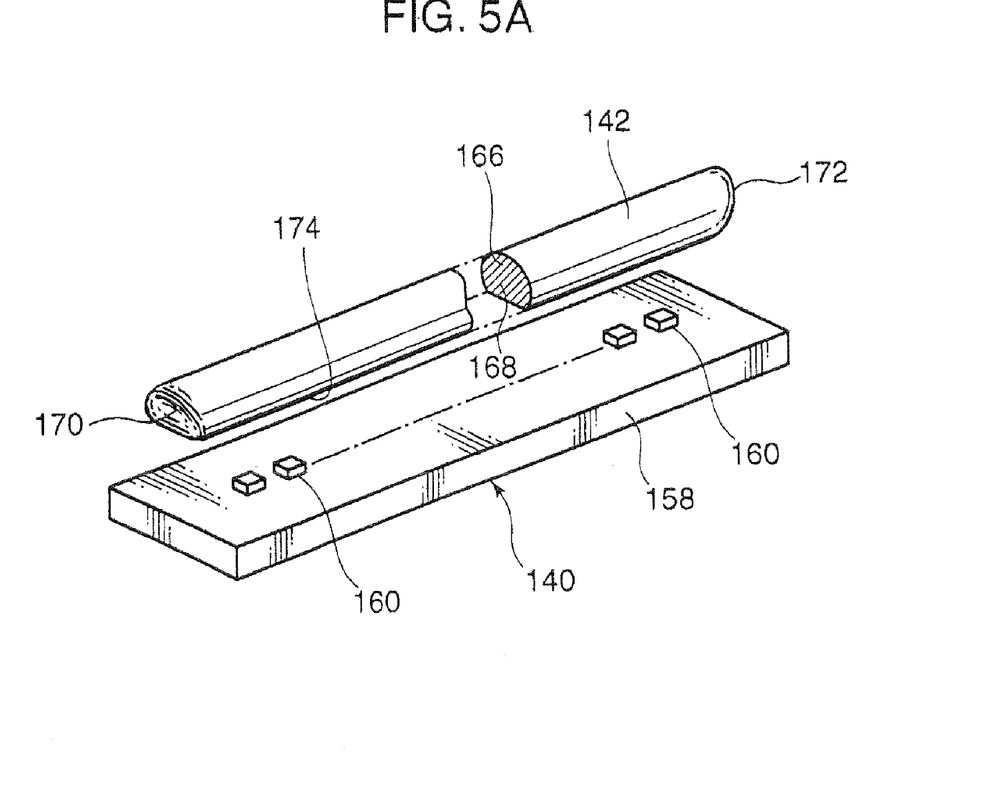

Regardless of presence or absence of the reflective films 194, forming the angle of each of the opposite end surfaces 170, 172 in the main scanning direction with respect to the bottom surface 174 to be an obtuse angle which totally reflects incident light from the light emitting-diode 160 which is at a predetermined position (for example, outermost position) of the peripheral portion in the main scanning direction of the mounting substrate 158 further increases the light intensity of the peripheral portion. Further, regardless of presence or absence of the reflective film 194, the angle of each of the opposite end surfaces 170, 172 in the main scanning direction with respect to the bottom surface 174 may be set so as to have an obtuse angle as shown in FIGS. 5a and 5b to make the outer peripheral surface be a convex surface.

(3) In the above-described embodiment, the light-collective member 142 is integrally including the collective lens portion 166 and the light-leading portion 168. However, the present invention is not limited to this. For example, another collective lens portion may be formed integrally on the light-emitting diode 160 of the light-leading portion 168, or only the collective lens portion 166 may be provided without forming the light-leading portion 168.

(4) In the above-described embodiment, the light source 140 is mounted to the retaining member 138. However, the present invention is not limited to this. For example, the light source 140 may be directly mounted to the running member 112 by partially standing the flat plate portion 116 of the running member 112 without using the retaining member 138. In the case where the retaining member 138 is not used as described above, the supporting member 186 which supports the reflective member 144 may be also formed by partially standing the flat plate portion 116 of the running member 112. In the case of using the retaining member 138 and the case of not using the retaining member 138, there is no difference on the point that the light source 140 is mounted to the running member 112.

(5) In the above-described embodiment, the light source portion 114 includes the reflective member 144. However, the present invention is not limited to this. For example, in the case where the scattered light from the light source 140 is small, the reflective member 144 is not necessarily needed.

(6) In the above-described embodiment, the light source portion 114 includes the reflective hood 162. However, the present invention is not limited to this. For example, in the case where the scattered light from the light source 140 is small, the reflective hood 162 is not necessarily needed.

(7) In the above-described embodiment, the image capturing portion 22 is so configured as to adopt a CCD method using a CCD as the imaging device 34. However, the present invention is not limited to this. For example, the image capturing portion 22 may be so configured as to adopt a CIS (Contact Image Sensor) using a C-MOS in place of the CCD. In this case, the reflective mirrors 26, 28, 30 would not be necessary, and the C-MOS sensor is provided at a position of the reflective mirror 26 of the running member 112.

(8) In the above-described embodiment, the image forming apparatus 10 adopting the image reading apparatus according to the present invention constitutes a monochromatic copying machine which includes only one photoconductive drum 70. However, the present invention is not limited to this. For example, it may be a color copying machine having a plurality of photoconductive drums, or a color copying machine having one photoconductive drum. Further, not limited to a copying machine, the image forming apparatus 10 may constitute a facsimile machine or a complex machine having functions of those.

In summary, the present invention includes an image reading apparatus which forms an image of a reflected light reflected from a document surface as a document image on a light-receiving surface of an imaging device, the image reading apparatus comprising: a running member which is so configured as to run along the document surface; a light source mounted to the running member for irradiating a light to the document surface, the light source extending in a main scanning direction which is perpendicular to a running direction of the running member; an illuminating portion including a light-collective member which is mounted in front of the light source for collecting a light outputted from the light source toward the sub-scanning direction which is the running direction of the running member. Each of opposite end surfaces in the main scanning direction of the light-collective member is so formed as to have an obtuse angle with respect to a bottom surface facing the light source.

According to the present invention, the light-collective member collects light outputted from the light source toward the sub-scanning direction. Accordingly, the illumination efficiency becomes excellent. Further, each of the opposite end surfaces in the main scanning direction of the light-collective member is so formed as to have an obtuse angle with respect to a bottom surface facing the light source, the reflection angle becomes larger at each of opposite end surfaces of the light-collective member to which the light enters from the light source, so that the light intensity increases at the end portions in the main scanning directions of the light-collective member. Consequently, the image reading apparatus is capable of easily suppressing image deterioration at the peripheral portions in the main scanning direction of the imaging device.

Further, it may be so configured that the light-collective member includes a reflective film at each of the opposite end surfaces for inwardly reflecting the light outputted from the light source and inputted through the bottom surface.

According to the feature as described above, since the reflective film is formed on each of the opposite end surfaces of the light-collective member, the reflective light intensity becomes greater at the opposite end surfaces, so that the light intensity at the end portions in the main scanning direction of the light-collective member increases. Consequently, the image reading device is capable of easily suppressing image deterioration at the peripheral portions in the main scanning direction of the imaging device.

Further, the light source may be so configured as to include a plurality of light-emitting diodes which are aligned in the main scanning direction.

According to the configuration described above, since the light source includes a plurality of light-emitting diodes aligned in the main scanning direction, the illuminance distribution has a sharp-pointed peak characteristic. Accordingly, the illumination efficiency becomes excellent, and electric power consumption can be suppressed effectively.

Further, an image forming apparatus according to the present invention includes an image forming apparatus for forming an image of a reflected light reflected from a document surface as a document image on a light-receiving surface of an imaging device and writing an electrostatic latent image to a photoconductive drum in accordance with image data obtained by the imaging device, and the image forming apparatus includes the above-described image reading apparatus.

According to the above-described image forming apparatus, the light-collective member collects light outputted from the light source toward the sub-scanning direction. Accordingly, the illumination efficiency becomes excellent. Further, each of the opposite end surfaces in the main scanning direction of the light-collective member is so formed as to have an obtuse angle with respect to a bottom surface facing the light source, the reflection angle becomes larger at each of opposite end surfaces of the light-collective member to which the light enters from the light source, so that the light intensity increases at the end portions in the main scanning directions of the light-collective member. Consequently, the image forming apparatus is capable of easily suppressing image deterioration at the peripheral portions in the main scanning direction of the imaging device.

This application is based on Japanese Patent Application Serial No. 2007-039854 filed in Japan Patent Office on Feb. 20, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus which forms an image of a reflected light reflected from a document surface as a document image on a light-receiving surface of an imaging device, the image reading apparatus comprising:
   a running member which is so configured as to run along the document surface;
   a light source mounted to the running member for irradiating a light to the document surface, the light source extending in a main scanning direction which is perpendicular to a running direction of the running member;
   an illuminating portion including a light-collective member which is mounted in front of the light source for collecting a light outputted from the light source toward the sub-scanning direction which is the running direction of the running member, wherein each of opposite end surfaces in the main scanning direction of the light-collective member is so formed as to be a convex surface and to have an obtuse angle with respect to a bottom surface facing the light source.

2. The image reading apparatus according to claim 1, wherein the light-collective member includes a reflective film at each of the opposite end surfaces for inwardly reflecting the light outputted from the light source and inputted through the bottom surface.

3. The image reading apparatus according to claim 2, wherein the light source includes a plurality of light-emitting diodes which are aligned in the main scanning direction.

4. The image reading apparatus according to claim 1, wherein the light source includes a plurality of light-emitting diodes which are aligned in the main scanning direction.

5. An image forming apparatus for forming an image of a reflected light reflected from a document surface as a document image on a light-receiving surface of an imaging device and writing an electrostatic latent image to a photoconductive drum in accordance with image data obtained by the imaging device, the image forming apparatus including an image reading apparatus which forms an image of a reflected light reflected from a document surface as a document image on a light-receiving surface of an imaging device, the image reading apparatus comprising:
   a running member which is so configured as to run along the document surface;
   a light source mounted to the running member for irradiating a light to the document surface, the light source extending in a main scanning direction which is perpendicular to a running direction of the running member;
   an illuminating portion including a light-collective member which is mounted in front of the light source for collecting light outputted from the light source toward the sub-scanning direction which is the running direction of the running member, wherein
   each of opposite end surfaces in the main scanning direction of the light-collective member is so formed as to be a convex surface and to have an obtuse angle with respect to a bottom surface facing the light source.

6. The image forming apparatus according to claim 5, wherein the light-collective member includes a reflective film at each of the opposite end surfaces for inwardly reflecting the light outputted from the light source and inputted through the bottom surface.

7. The image forming apparatus according to claim 5, wherein the light source includes a plurality of light-emitting diodes which are aligned in the main scanning direction.

8. The image forming apparatus according to claim 6, wherein the light source includes a plurality of light-emitting diodes which are aligned in the main scanning direction.

* * * * *